Patented July 21, 1936

2,047,952

UNITED STATES PATENT OFFICE 2,047,952

CELLULOSE ETHER

Deane C. Ellsworth, Gordon Heights, Del., assignor to E. I. du Pont de Nemours & Company, Wilmington, Del., a corporation of Delaware No Drawing. Application December 10, 1932, Serial No. 646,715

11 Claims. (Cl. 260—152)

This invention relates to cellulose ethers, and more particularly, to negatively substituted unsaturated ethers of cellulose, and to the preparation of such ethers.

Heretofore a considerable number of cellulose ethers have been known, but cellulose ethers in which the ether group contains an olefinic double bond, contains at least three carbon atoms and has at least one hydrogen atom of the olefinic hydrocarbon chain substituted by a negative substituent group, have never been prepared or suggested as far as applicant knows.

An object of this invention is to provide new cellulose ethers of the above described type and to provide a process of preparing such ethers. Other objects will be apparent from the description given hereinafter.

The above objects are accomplished according to the present invention by reacting cellulose in the presence of a base and at an elevated temperature with a negatively substituted unsaturated olefinic halide and isolating the resulting product.

More specifically, the present invention comprises the preparation of these ethers by reacting cellulose, pretreated or not, in the presence of a caustic alkali and at a temperature of 70–160° C. with a halide of a negatively substituted unsaturated hydrocarbon having the reactive halogen atom attached to a carbon atom at least once removed from an olefinic double bonded carbon atom, and isolating the resulting ether. The cellulose may be reacted in a caustic alkali solution to form an alkali cellulose prior to reacting with the halide.

The following examples are given to illustrate the preparation of ethers according to the present invention:—

*Example 1.*—0.4 mol. cellulose (65 grs.) oven-dried cotton linters are steeped in 36% sodium hydroxide solution at room temperature for 1½ hours, then pressed to a weight of 308 grams. Such an alkali cellulose contains about 2.4 mols NaOH and 8.0 mols of water. The alkali cellulose is shredded for an hour in a Werner-Pfleiderer type shredder at 25° C. To it in the shredder is added 2.0 mols (262 grs.) of 1,3-dichlorobutene-2. No diluent or other substance is used. The reaction is carried on in the shredder at 100° C. for 16 hours.

After the mixture has been cooled, the product is dispersed in 1 liter of benzyl alcohol. In a little time the dispersion becomes thick and creamy. It is filtered to remove fibers and unreacted material. The solution is then stirred slowly into a considerable excess (3 liters) of methanol which causes the cellulose ether to separate as sticky yellow-white curds. These are filtered off and stirred again and again with methanol until the sticky quality is lost and a definitely sandy precipitate obtained. This stickiness is caused by the solubility in the residual by-products and reagents from the first precipitation, which solvents are gradually washed out by the methanol. The product is extracted with hot methanol to remove the last traces of organic by-products and then with water to remove salt and any remaining caustic. It is dried at 65° C.

The dry, powdery product obtained resembles other cellulose ethers in physical appearance. Although this product is soluble before drying, witness the process of purification, it is insoluble after drying, although highly swollen in benzyl alcohol, in pyridine, and in toluene-alcohol. It is but slightly swollen in chloroform-alcohol and quite insoluble in acetone.

The analyses for chlorine of the product obtained as above determined that there was 13.18% chlorine present in the dry ether from which it appears there was 0.9

$$(-CH_2-CH=CCl-CH_3)$$

group per glucose unit in the cellulose. This is then approximately a mono-ether, i. e., the mono γ-chlorocrotonyl ether of cellulose.

*Example 2.*—Eighty-one grams (0.5 mol.) oven-dried cotton linter cellulose are steeped for 2 hours in 48% sodium hydroxide solution, then pressed to a weight of 407 grams. Such an alkali cellulose is of molar concentration of about 4.4 NaOH and 8.3 H₂O. This alkali cellulose is shredded for two hours and then put into an autoclave with 4.0 mols (500 grs.) of 1,3-dichlorobutene-2. The temperature is raised to 135° C. at which the reaction is carried on for 18 hours. The product from the autoclave is a swollen, dark brown, fibrous, or cork like mass, quite without any sticky character and having no free liquid. It is boiled up several times with water to remove steam-volatile impurities, caustic, and salts. The firm spongy mass is extracted with cold, then with hot, methanol and dried at 65° C.

Carrying out the above procedure, the dry weight of the product obtained was 159 grams, a yield equivalent to 1.75 (CH₂—CH=CCl—CH₃) groups for each glucose unit in the cellulose, and analysis gave a chlorine content of 15.91%. The product is a γ-chlorocrotonyl cellulose.

*Example 3.*—0.2 mol. (34 grs.) of oven-dried cellulose is steeped in 38% NaOH solution for 1½ hours at room temperature. It is pressed to 154 grams and shredded for an hour. Such an alkali cellulose contains about 0.2 mol. cellulose, 1.2 mols NaOH, and 4 mols of H₂O. To the alkali cellulose in the shredder is added 1 mol. of freshly prepared cinnamyl chloride (160 grams). The shredder is then closed off and the temperature raised to 90–100° C. and the reaction continued for 20 hours with shredding and kneading. The mass is then cooled and removed from the shredder. It is a gummy brown mass resembling crude benzyl cellulose. It is then dispersed in benzyl alcohol in which much dissolves. The entire dispersion is coagulated in methanol, in which the cinnamyl cellulose obtained is precipitated as whitish flakes, somewhat sticky but readily filtered out. After washing several times with methanol, it is extracted with methanol and then with water, and dried. On analysis this proved to have 58.48% carbon, equivalent to 0.57 cinnamyl ($-CH_2-CH=CHC_6H_5$) group per glucose unit in the cellulose. No solvent was found for this dried material.

*Example 4.*—Fifty grams of the cinnamyl cellulose prepared in Example 3 are wet out thoroughly with methanol and then washed thoroughly with water and pressed to a weight of 150 grams. This is then steeped in 1 kg. of 50% NaOH for 2 hours. This is again pressed out to 241 grams which makes an alkali cellulose containing about 2.1 mols NaOH and 8 mols $H_2O$. To this 1.4 mols (214 grs.) of cinnamyl chloride is added in the shredder. The temperature is maintained at 90–100° C. for 18 hours. The product obtained is a thin gummy solution. It is dispersed in 600 cc. of benzyl alcohol and filtered, the filtrate coagulated in methanol, filtered off, redissolved in benzyl alcohol, and again precipitated in methanol, filtered, washed thoroughly with water, methanol, extracted with methanol and dried. On analysis this proved to have 71.2% carbon equivalent to 1.7 cinnamyl groups per glucose unit in the cellulose. The dried product, cinnamyl cellulose, is swollen by, but insoluble in, pyridine, acetone, chloroform-alcohol, toluene-alcohol, and benzyl alcohol.

*Example 5.*—Two hundred fifty parts of air dried wood pulp in board form is soaked in 50% caustic soda solution for 1 hour, pressed to 1,056 parts and shredded for a half hour. The resulting alkali cellulose contains approximately 22% cellulose, 42% NaOH, and 36% water. Nine hundred parts of the alkali cellulose, 420 parts of solid powdered sodium hydroxide, 320 parts water, 1,600 parts of benzene, and 1,660 parts of 1,3-dichlorobutene-2 are charged into an autoclave, agitated, and heated for six hours at 130–150° C. The reaction mixture is worked up as in the previous examples and the γ-chlorocrotonyl cellulose isolated.

*Example 6.*—One hundred parts of cellulose, 700 parts of benzene, and 970 parts of 1,3-dichlorobutene-2 are charged into an autoclave with stirring while being warmed to 50–60° C. Meanwhile a solution of 400 parts of caustic soda in 200 parts of water is prepared (at an elevated temperature) and is added gradually to the mixture in the autoclave. The autoclave contents are heated to 130–160° C. and agitated at this temperature for 6–8 hours. The reaction mixture is purified in the usual manner and the γ-chlorocrotonyl cellulose isolated.

*Example 7.*—Fifty parts cellulose, 100 parts water, 200 parts caustic soda, 350 parts toluene, and 420 parts 1,3-dichloro-2-methyl propene-1 are mixed at 125° C. for 16–20 hours, purification being carried out as before. The resulting ether is soluble in organic solvents, before drying, but becomes less soluble or insoluble following a drying step in air.

*Example 8.*—One hundred seventy-six parts of a mono-methyl cellulose (19% methoxyl) are mixed in a shredder or similar machine with 104 parts of 49.5% sodium hydroxide solution. When this has made a uniform slurry or paste, 762.5 parts of cinnamyl chloride are mixed in and the temperature of the reaction raised to 125° C. by means of steam in the outer jacket of the shredder. This is held for 6 hours, then the mass is cooled and 404 parts of 50% sodium hydroxide solution are again added and kneaded into the mixture during one hour. Another addition, this time of 610 parts, of cinnamyl chloride is made and the temperature is again raised to 125° C., at which it is held for 12 hours, while the mass is continuously kneaded and stirred. There is removed a rather thin gummy solution of the mixed cinnamyl methyl cellulose ether in its own by-product cinnamyl alcohol. This is filtered, if necessary, after diluting with more cinnamyl alcohol, to remove salt, resistant fibers, and the like. It may be necessary to carry this procedure out at slightly raised temperature to prevent crystallization. If, then, the product is coagulated in methanol, and washed and extracted with methanol and with water, a white, firm, powdery, damp product will be obtained. By drying at low temperature, as in a vacuum dryer, or under conditions that prevent oxidation or polymerization of the reactive double bond in this ether, there will be obtained a product soluble in a wide variety of pure and mixed solvents such as benzyl alcohol, pyridine, nitrobenzene, ethylene chlorohydrin, chloroform-alcohol, toluene-alcohol, and the like.

*Example 9.*—Sixty-four parts of a partially benzylated cellulose containing 1 benzyl group for each two glucose units in the cellulose, 100 parts water, 200 parts caustic soda, 350 parts toluene, and 420 parts 1,3-dichloro-2-methyl propene-1 are mixed at 125° C. for 16–20 hours, purification being carried out as before. The resulting ether is soluble in organic solvents, before drying, but becomes less soluble or insoluble following a drying step in air.

*Example 10.*—Fifty parts cellulose, 100 parts water, 200 parts caustic soda, 350 parts toluene, 13.6 parts of ethylene oxide, and 405 parts of 2-chlorocrotonic acid are mixed at 100° C. for 16–20 hours. The result is a mixed ether containing hydroxyethyl groups susceptible of analysis by the Zeisel method of determination and also containing the group $$(-CH_2CH=CH-COOH)$$

which retains the salt forming properties of the carboxyl group. This ether, freshly prepared, is nicely soluble in dilute caustic soda solution, from which films may readily be prepared, but after oxidation or polymerization these become progressively less soluble.

The above examples merely illustrate the preparation of a few of the ethers coming within the scope of the present invention, which broadly comprises unsaturated ethers of cellulose in which the ether group contains an olefinic double bond, is of at least three carbon atoms in length, and has at least one hydrogen atom of the olefinic hydrocarbon chain substituted by a negative substituent group. A more specific group of ethers coming within the scope of this invention is that in which the ether group contains an olefinic double bond at the carbon atom once removed from the carbon atom attached to the cellulose through the ether-oxygen, is of from 3–9 carbon atoms, inclusive, in length, and has at least one hydrogen atom of the olefinic hydrocarbon chain substituted by a negative substituent group. Among the negative substituent groups may be mentioned the following: phenyl, naphthyl, fluorine, chlorine, bromine, iodine, nitrile, carboxyl, and carbethoxyl.

As starting materials for the preparation of these unsaturated ethers may be used untreated cellulose in the form of cotton linters or wood pulp, hydrated or hydro cellulose, oxidized cellulose, or cellulose conversion products prepared by other methods of pretreatment. Partially substituted cellulose, as low ethyl, methyl, or glycol celluloses, may be used with advantage instead of cellulose. Furthermore, more highly substituted cellulose ethers, as mono ethyl cellulose or dimethyl cellulose, may have a negatively substituted unsaturated group added to them through the herein described etherification procedure. Also mixed ethers may be prepared by using mixed reagents, as a mixture of benzyl chloride and cinnamyl chloride, ethyl chloride and 1,3-dichlorobutene-2, and the like. Pretreatment by forming the formate or other esters is also of benefit, but etherified cellulose is preferred to esterified cellulose as a raw material.

The alkali cellulose used in the reaction may be formed from the ingredients in situ, or in the more usual manner of steeping in a large volume of caustic and pressing out the excess. Solid caustic may be added if a more highly caustic mixture is required, and it may be added in stepwise portions to care for the using up of caustic as the reaction proceeds. The entire reaction may be carried out in steps. Alkali cellulose ageing prior to the etherification increases reactivity of the cellulose, lowers viscosity, and is therefore of much benefit in the production of ethers for certain uses.

The temperature of the reaction may be carried out between 70-160° C. and diluents may or may not be used, as indicated in the examples. The time of reaction is dependent upon the degree of substitution desired in the ether.

As examples of negatively substituted unsaturated alkyl halides other than those disclosed above, may be mentioned the following:

1,3-dibromobutene-2
1-bromo, 3-chlorobutene-2
1-3-dichloropropene-1
2-3-dichloropropene-1
1-2-3-trichloropropene-1
3-chloro-2-bromopropene-1
1-3-dibromopropene-1
1-2-3-triiodopropene-1
1-2-3-tribromopropene-1
cinnamyl bromide
2-bromocrotonitrile
1,3,dichloro, 3-phenyl-propene-2
1-3-4-tetrabrombutene-2
3,4,5,6,tetrabromohexene-1.

In carrying out the present process, it is preferred that the reactive halogen atom be attached to a carbon atom once removed from the olefinic double bond and that the negative substituent, particularly when a halogen atom, should be attached to a carbon atom attached by the olefinic double bond to another carbon atom. The apparent reason for this is that the halogen atom attached to a carbon atom once removed from the double bond is highly reactive, whereas negative substituents attached to a carbon atom of the olefinic linkage appear to be unreactive and stable throughout the etherification process.

The ethers of the present invention are characterized by their low inflammability as compared to ethyl cellulose or cellulose acetate. This is true to an advantageous degree in those ethers where the negative substituent in the ether radical is a halogen.

As many apparently widely different embodiments of this invention may be made without departing from the spirit and scope thereof, it is to be understood that the invention is not limited to the specific embodiments thereof except as defined in the appended claims.

I claim:
1. An unsaturated ether of cellulose in which the ether group contains an olefinic double bond, is of at least three carbon atoms in length, and has at least one hydrogen atom of the olefinic hydrocarbon chain substituted by a negative substituent group.
2. An unsaturated ether of cellulose in which the ether group contains an olefinic double bond at the carbon atom once removed from the carbon atom attached to the cellulose through the ether-oxygen, and has at least one hydrogen atom of the olefinic hydrocarbon chain substituted by a negative substituent group.
3. An unsaturated ether of cellulose in which the ether group contains an olefinic double bond at the carbon atom once removed from the carbon atom attached to the cellulose through the ether-oxygen, is of from 3-9 carbon atoms, inclusive, in length, and has at least one hydrogen atom of the olefinic hydrocarbon chain substituted by a negative substituent group.
4. A mixed ether of cellulose in which one ether group contains an olefinic double bond, is of at least three carbon atoms in length, and has at least one hydrogen atom of the olefinic hydrocarbon chain substituted by a negative substituent group, and another ether group selected from the class consisting of alkyl and aralkyl ether groups.
5. Process of preparing cellulose ethers which comprises reacting cellulose in the presence of an alkali metal hydroxide base and at reaction temperature with a negatively substituted unsaturated olefinic halide.
6. Process of preparing cellulose ethers which comprises reacting cellulose in the presence of a caustic alkali and at a temperature of 70°–160° C. with a halide of a negatively substituted unsaturated hydrocarbon having the reactive halogen atom attached to a carbon atom once removed from an olefinic double bonded carbon atom.
7. A chlorobutenyl ether of cellulose.
8. An ethyl chlorobutenyl ether of cellulose.
9. An unsaturated ether of cellulose in which the ether group contains an olefinic double bond, is of at least three carbon atoms in length, and has at least one hydrogen atom of the olefinic hydrocarbon chain substituted by a halogen atom.
10. An unsaturated ether of cellulose in which the ether group contains an olefinic double bond, is of at least three carbon atoms in length, and has at least one hydrogen atom of the olefinic hydrocarbon chain substituted by an aromatic group.
11. An unsaturated ether of cellulose in which the ether group contains an olefinic double bond, is of at least three carbon atoms in length, and has at least one hydrogen atom of the olefinic hydrocarbon chain substituted by a phenyl group.

DEANE C. ELLSWORTH.